United States Patent

Romolo et al.

[11] Patent Number: 6,089,291
[45] Date of Patent: Jul. 18, 2000

[54] SELF-TENSIONING DEVICE FOR SNOW CHAINS

[75] Inventors: Airoldi Romolo, Lecco; Arrigoni Neri Marco, Ballabio, both of Italy

[73] Assignee: Konig S.p.A., Moiteno (Lecco), Italy

[21] Appl. No.: 09/323,679

[22] Filed: Jun. 2, 1999

[30] Foreign Application Priority Data

Jan. 28, 1999 [EP] European Pat. Off. ............ 99830031

[51] Int. Cl.⁷ .................................................. B60C 11/00
[52] U.S. Cl. ................. 152/231; 152/213 R; 152/218; 152/219; 152/222
[58] Field of Search ............... 152/208, 213 R, 152/217, 218, 219, 221, 222, 223, 231, 239, 241

[56] References Cited

U.S. PATENT DOCUMENTS

| | | |
|---|---|---|
| 1,620,894 | 3/1927 | Jones . |
| 2,110,152 | 3/1938 | Hoffer ................................. 152/213 R |
| 2,275,994 | 3/1942 | Ruhkala . |
| 2,316,718 | 4/1943 | Royer ..................................... 152/219 |
| 2,332,113 | 10/1943 | Reed .................................... 152/213 R |
| 2,717,623 | 9/1955 | Maire et al. ............................ 152/219 |
| 2,820,502 | 1/1958 | Spencer ................................. 152/218 |
| 3,893,499 | 7/1975 | Von Der Hellen ..................... 152/217 |
| 4,118,834 | 10/1978 | Weidler . |
| 4,146,075 | 3/1979 | Riedel ................................. 152/213 R |
| 4,240,485 | 12/1980 | Barnett et al. .......................... 152/219 |
| 4,836,258 | 6/1989 | Ellis ........................................ 152/217 |
| 5,082,039 | 1/1992 | Franklin . |
| 5,804,001 | 9/1998 | Christian ................................. 152/218 |

FOREIGN PATENT DOCUMENTS

| | | |
|---|---|---|
| 0127 571A | 12/1984 | European Pat. Off. . |
| 0 255 119A | 2/1988 | European Pat. Off. . |
| 0 352 873A | 1/1990 | European Pat. Off. . |
| 2253813 | 5/1974 | Germany ........................... 152/213 R |
| 157251 | 2/1953 | Switzerland ......................... 152/217 |
| 296222 | 4/1954 | Switzerland ....................... 152/213 R |
| WO 98/39168A | 9/1998 | WIPO . |

Primary Examiner—S. Joseph Morano
Assistant Examiner—Long Bae Nguyen
Attorney, Agent, or Firm—Sughrue, Mion, Zinn, Macpeak & Seas, PLLC

[57] ABSTRACT

A self-tensioning device for snow chains (2) for vehicles includes an outer element (3) closable in a ring, suitable to be placed on the outer side of the wheel (1), an inner element closable in a ring, suitable to be placed on the inner side of the wheel (1), inner and outer elements being joined by variously composed elements (10) creating the traction on the tread, the outer element having a terminal portion (7) passing through a non-return device (5) which makes it slide only in the chain tensioning direction and not in the opposite slackening direction, a storage block (20) containing an elastic element (21) able to hook, tension and retain the terminal portion (7) being provided on the outer ring.

11 Claims, 3 Drawing Sheets

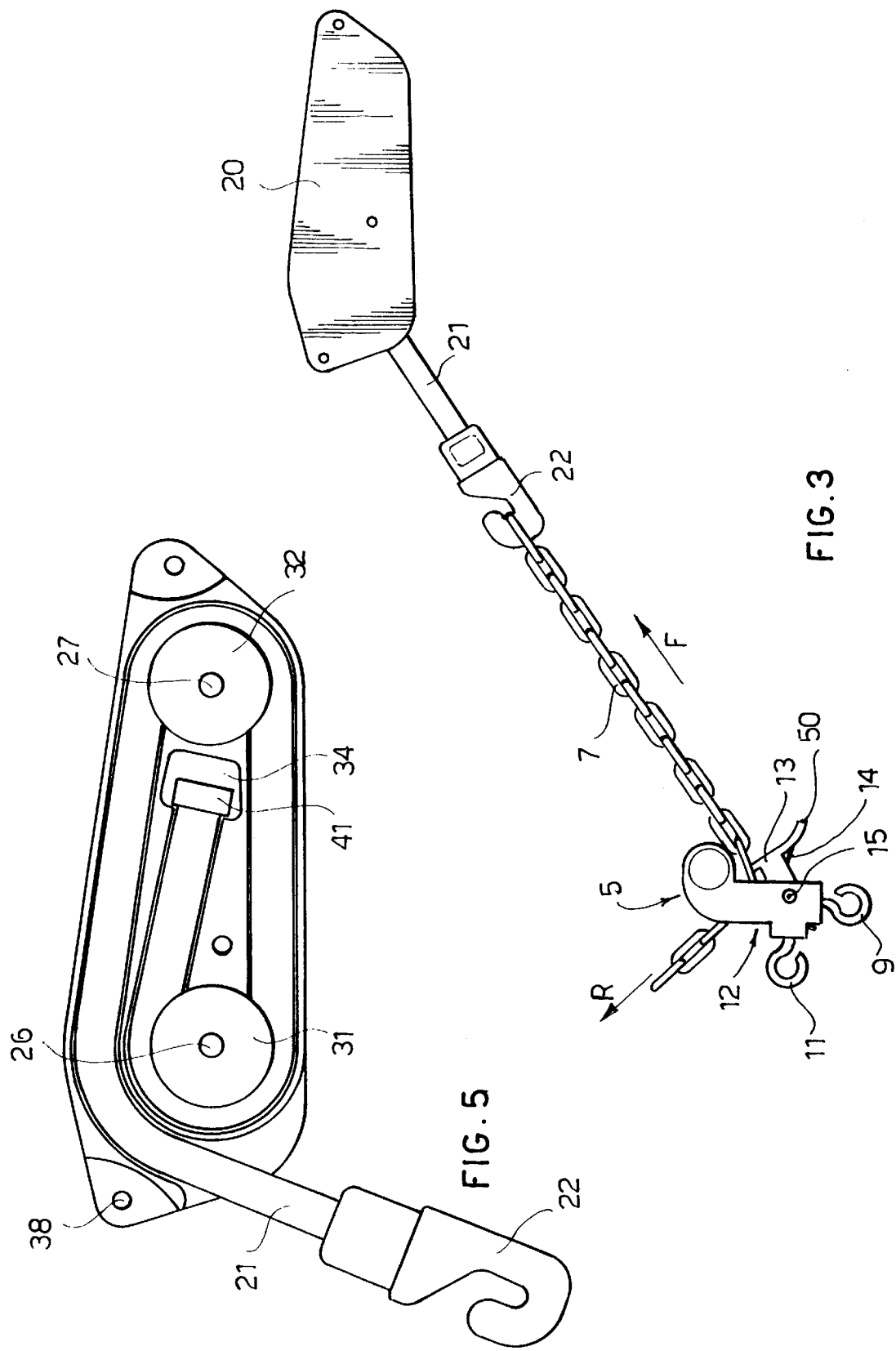

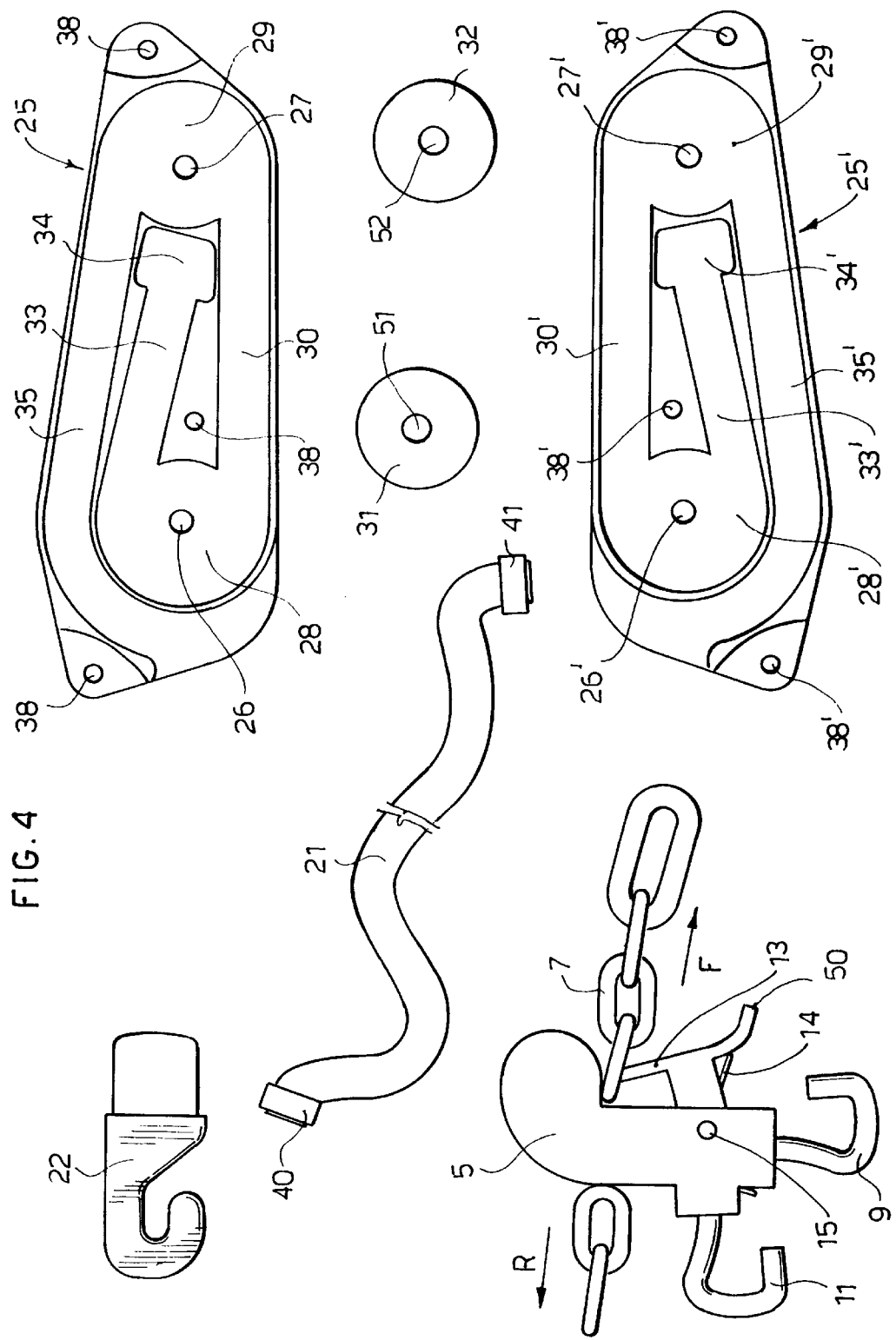

SELF-TENSIONING DEVICE FOR SNOW CHAINS

The present invention relates to a self-tensioning device for snow chains or anti-skid devices destined to be mounted on vehicle tires.

When a vehicle travels on a road surface covered with snow, sleet or ice, its tires do not have a good grip and dangerous swerving or skidding of the vehicle can occur. To avoid these problems it is customary to use anti-skid devices, commonly called snow chains.

Snow chains, normally mounted on the driving wheels of the vehicle, bite into the snow and/or ice deposited on the road surface, increasing the tread traction and allowing the vehicle tires to achieve a good grip.

As is known, a snow chain generally consists of two side members, (chains, flexible cables, steel wires, ropes or the like) which during use are closed like a ring on the inner side and outer side of the wheel, respectively. These side elements are connected by a series of portions of chain variously disposed to achieve traction on the tread, the whole being completed by a tensioning device for said elements, known as a tensioner.

Normally this tensioning device consists of an elastic ring provided with a series of hooks that are fixed at various points of the outer side of the chain or of a chain tensioning chain or else with one or more cams or levers.

The market demands tensioning devices that are increasingly easy and rapid to mount, reduce the risk of injury to the user, ensure secure fixing of the chains and limit wear on the tires and the tire rims of the vehicle.

In fact, for example, the classical ring-type tensioning device requires fixing of a considerable number of hooks to the links of the chains, which, besides complicating the mounting operation, can cause injuries to the user's hands, in the event of it slipping from the hands during use.

Other tensioning devices comprise a terminal portion of chain of the outer ring element that is passed in a non-return block, which allows traction of said terminal chain in one direction and prevents movement in the other direction. The terminal portion of chain is pulled as far as possible by the user and hooked to the outer ring element of the anti-skid device.

This system does not permit good tensioning of the anti-skid device. In fact the portions of chain that connect the inner ring element to the outer ring element that are situated in the bottom part of the tire stop against the road surface and therefore cannot be adequately tensioned.

As a result, after starting the vehicle the user will feel after travelling about a hundred meters that the chains are slackening; consequently, to avoid possible damage, the user will be obliged to stop the vehicle, get out and tighten the chains more.

The object of the invention is to eliminate the drawbacks of known tensioning devices, and to create a tensioning device for snow chains which, once mounted, is able to maintain constant, continuous self-tensioning of the chains in the utmost safety.

Another object of the present invention is that of providing such a self-tensioning device for snow chains that is extremely practical, simple to handle and is safe for the user.

These objects are achieved in accordance which the invention having the characteristics listed in appended independent claim 1.

Preferred embodiments of the invention will become apparent from the dependent claims.

Essentially the self-tensioning device according to the invention provides for one end of the outer ring element of the snow chains to be hooked to a non-return block and the other end comprises a free terminal portion. The terminal portion is passed through the non-return block that allows pulling thereof in only one direction and not in the opposite direction.

In this manner, by pulling the terminal portion, it is possible to bring the chains under tension and once the terminal portion is released, the non-return block prevents the chains from slackening.

A storage block that contains an elastic element is provided on the outer ring element. An elastic element is pulled out of the block, by means of traction, and is hooked to the end of the terminal portion. Thanks to the elastic returning force of the elastic element and to a suitable sliding system inside the storage block, the elastic element is recalled inside the storage block taking with it the terminal portion and thus ensuring self-tensioning of the snow chains.

Said system is extremely simple and practical, since the user has to hook only the hook of the elastic element to the end of a terminal portion and does not have to exert excessive traction on the terminal portion because said traction is exerted by the return of the elastic element.

Furthermore, once the vehicle has been started, the elastic element continues to exert its returning force on the terminal portion. Thus the portions of chain that have not been adequately tensioned because they were blocked between the tire and the road surface are further tensioned. In this manner uniform tensioning of the chain on the whole wheel is obtained, allowing perfect centering and balancing of the chain on the tire.

With the self-tensioning system according to the invention the possibility that the snow tires might be incorrectly mounted, with consequent poor operation of the tire as well as deterioration and possibly damage thereto, is therefore avoided.

Further characteristics of the invention will be made clearer by the detailed description that follows, referring to a purely exemplary and therefore non-limiting embodiment thereof, illustrated in the appended drawings in which:

FIG. 3 is an enlarged view of a detail of the self-tensioning device of FIGS. 1 and 2;

FIG. 4 is a partially exploded view of the self-tensioning device of FIG. 3;

FIG. 5 is a plan view of an open storage block of the device according to the invention, with the elastic element gathered therein.

The self-tensioning device according to the invention is described with the aid of the figures.

Figure 2:
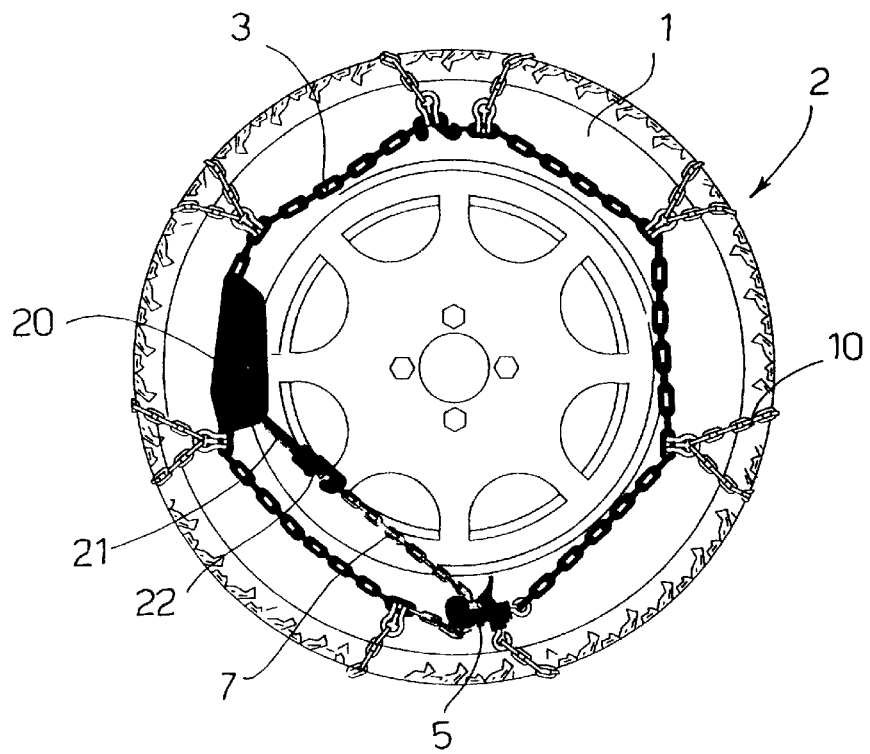
FIG. 2 is a view, like FIG. 1, of the self-tensioning device, with the elastic element retracted and the chains applied to the wheels tensioned.
Figure 1:
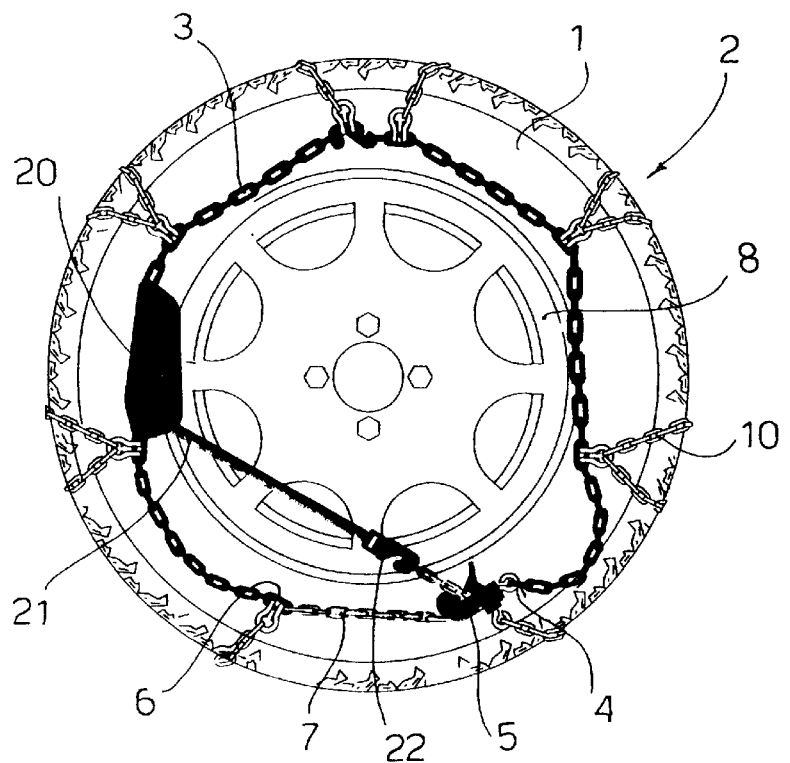
FIG. 1 is a front view of the self-tensioning device, taken from the outer side of the wheel, in which the elastic element is expanded and the chains applied to the wheel are slack.

FIGS. 1 and 2 show a wheel 1 of the vehicle on which a snow chain, indicated as a whole by reference numeral 2 is applied as an anti-skid device.

The chain 2 comprises: an element (not visible) closed in a circle or ring on the inner side of the wheel, an element 3 disposed in a circle or ring on the outer side of the wheel and a series of portions of 10 of anti-skid chain disposed transversally on the tread, which achieve joining between the outer element 3 and the inner element.

The outer ring 3 is hooked at one end 4 to a non-return block 5 and is connected at the other end 6 to a terminal portion of chain 2. The terminal portion 7 can also be made of plastic or any other suitable material to avoid possible damage to the rim 8 of the wheel, following rubbing therewith.

As shown better in FIGS. 3 and 4, the non-return block 5 comprises a hook 9 for hooking to the end 4 of the outer element 3, a hook 11 for hooking to a portion 10 of chain and an opening 12 for passage of the terminal portion 7. A pawl 13 is pivoted at 15 to the non-return block 5. The pawl 13 is urged by a spring 14 so that it is pushed against a link of the terminal portion 7, acting as a ratchet.

In practice, with reference to FIG. 3, sliding of the terminal portion 7 is allowed in the direction of the arrow F, when traction is exerted in this direction, whilst sliding in the opposite direction shown by the arrow R is prevented, and possible slackening of the chain is thus prevented.

When the snow chain is to be removed, it is sufficient to exert manual pressure on one end 50 of the pawl 13 which, turning around the pivot 15, disengages the corresponding link of the terminal portion 7. The terminal portion 7 can then be pulled in the direction of the arrow R, slackening the chain 2.

A storage block 20 is mounted in the outer ring element 3, said storage block containing an elastic cable 21 ending in a hook 22 destined to hook to the free end of the terminal portion 7.

As shown in FIG. 4 the storage block 20 comprises two substantially specular half-shells 25, 25'. The half-shell 25 comprises two pivots 26 and 27 centered respectively on two cylindrical seats 28 and 29 put in communication by a corridor 30. The seats 28 and 29 are able to receive two pulleys 31 and 32 which have respective central holes 51 and 52 for rotatable mounting on the pivots 26 and 27. The race of the pulleys 31 and 32 is of such a size as to be able to receive the elastic cable 21 and guide it as it winds around said pulleys.

A corridor 33 which terminates in widened seat 34 extends from the seat 28. A corridor 35 that exits from the half-shell 25 extends from the seat 29. The half-shell 25 also comprises holes 38 able to receive means for fixing to the half-shell 25'.

The half-shell 25' is specular with respect to the half-shell 25. In FIG. 4, the elements of half-shell 25' that are the same or similar to those of the half-shell 25 are indicated with the same reference numerals followed by a prime.

The elastic cable 21 is constrained at one end 40 to the hook 22 and at the other end has a head 41 that is blocked in the widened seat 34. As shown in FIG. 5, the elastic cable 21, starting from the head 41, passes into the corridor 33, winds around the pulley 31, passes into the corridor 30, winds around the pulley 32, passes into the corridor 35 and exits from the half-shell 25 in such a way that the end in which the hook 22 is fixed is situated outside the half-shell 25. At this point the half-shell 25' can be mounted on the half-shell 25 so as to form the storage block 20.

When the chains 2 must be mounted, the operator manually grasps the hook 22 and exerts traction on the elastic cable 21. The elastic cable 21 expands elastically running on the pulleys 31 and 32 and passing though the labyrinth formed by the corridors 33, 30 and 35. At this point the elastic cable 21, as shown in FIG. 1, is more or less in a position of maximum extension and the hook 22 can be hooked to the free end of the terminal portion 7 when the chains are still slack.

A first tensioning of the chains occurs through the manual action of the operator and through the elastic traction of the cable 21, which partly returns inside the storage block 20, pulling with it the terminal portion 7. This first tensioning of the chains 2 is only partial since some portions 10 at chain blocked between the tread and the road surface cannot be tensioned. When the operator starts the vehicle, the portions 10 of chain which were previously blocked between the tread and the road surface are freed. Since the action of elastic traction of the elastic cable 21 is continuous, the terminal portion 7 will be further pulled by the elastic cable 21, also causing tensioning of the parts of chain which had not been adequately tensioned before, as shown, for example, in FIG. 2.

What is claimed is:

1. A self-tensioning device for snow chain (2) comprising:
   an outer element (3) closable in a ring, suitable to be placed on an outer side of a wheel (1), said outer element comprising a terminal portion (7) and a storage block (20) containing an elastic element (21), said terminal portion (7) suitable to be pulled to bring the chain (2) under tension, said elastic element (21) able to be connected to an end of said terminal portion (7);
   an inner element that can be closed in a ring, suitable to be placed on an inner side of the wheel (1), said inner and outer elements being joined by variously composed elements (10) achieving traction on the wheel's tread; and,
   a non-return block (5) which allows said terminal portion (7) to slide therethrough only in a direction of the tensioning of said chains (2) and not in an opposite, slackening direction, said elastic element (21) able to constrain, tension and retain said terminal portion (7) by being connected to said end after passage of said end through said non-return block (5) in said direction of the tensioning.

2. A device according to claim 1, characterized in that said storage block (20) is mounted inline in said outer element (3) that can be closed in a ring.

3. A self-tensioning device for snow chains (2) comprising an outer element (3) closable in a ring, suitable to be placed on an outer side of a wheel (1), an inner element that can be closed in a ring, suitable to be placed on an inner side of a wheel (1), said inner and outer elements being joined by variously composed elements (10) achieving traction on a tread, said outer element (3) having a non-return block (5) and a terminal portion (7) suitable to be pulled to bring the chain (2) under tension, characterized in that a storage block (20) is provided on said outer element (3), said storage block (20) containing an elastic element (21) able to constrain, tension and retain said terminal portion (7), after said elastic element (21) passes through said non-return block (5) which allows sliding of said terminal portion (7) only in the tensioning direction of said chains (2) and not in the opposite, slackening direction, and characterized in that said storage block (20) provides a labyrinth-like path (33, 30, 35) in which said elastic element (21) runs.

4. A device according to any one of the preceding claims, characterized in that the elastic element (21) is passed on a system of pulleys (31, 32) inside the storage block (20).

5. A device according to any one of the preceding claims, characterized in that the elastic element (21) has at a first end thereof a head (41) able to be blocked in a seat (34) made inside the storage device (20).

6. A device according to any one of the preceding claims, characterized in that said terminal portion (7) is made of plasticated chain or a soft material as not to damage the rim (8) of the wheel (1) following possible rubbing therewith.

7. A device according to any one of the preceding claims, characterized in that said non-return block (5) is mounted on said outer element (3) closable in a ring.

8. A device according to claim 7, characterized in that said non-return block (5) is constrained to one end of said outer element (3) closable in a ring and to one of said elements (10) disposed on the tread of the tire.

9. A device according to any one of the preceding claims, characterized in that said non-return block (5) comprises a pawl (13) urged by a spring means (14) that pushes it against said terminal portion (7), acting as a ratchet, said pawl (13) being manually operable to allow sliding of the terminal portion (7) in the direction for slackening of the chains (2).

10. A device according to claim 3, characterized in that said storage block (20) is mounted inline in said outer element (3) that can be closed in a ring.

11. A device according to claim 1, wherein said storage block (20) has a shell, said elastic element (21) being extendable outside said shell when being connected to said end, said elastic element (21) being retractable inside said shell when not being connected to said end.

* * * * *